United States Patent
Wahl et al.

[11] Patent Number: 5,172,277
[45] Date of Patent: Dec. 15, 1992

[54] KINEMATIC FIXTURING OF OPTIC COMPONENTS

[75] Inventors: Roger L. Wahl, Simi Valley, Calif.; Jorge I. Farah, Jupiter, Fla.

[73] Assignee: The United States of America as represented by the Secretary of the Air Force, Washington, D.C.

[21] Appl. No.: 674,829

[22] Filed: Mar. 20, 1991

[51] Int. Cl.⁵ .............................................. G02B 7/02
[52] U.S. Cl. .................................... 359/820; 359/845; 359/859; 359/872; 248/562
[58] Field of Search ............... 359/196, 213, 214, 813, 359/819, 820, 823, 859, 869, 876, 873, 845, 827, 872; 248/562, 566, 575, 584, 592, 488

[56] References Cited
U.S. PATENT DOCUMENTS

| | | | |
|---|---|---|---|
| 3,588,232 | 6/1971 | Mostel . | |
| 4,029,400 | 6/1977 | Eitel | 359/845 |
| 4,057,332 | 11/1977 | Brubaker et al. | 359/894 |
| 4,175,835 | 11/1979 | Kuhn, Jr. | 359/848 |
| 4,268,123 | 5/1981 | Mesco | 359/848 |
| 4,442,524 | 4/1984 | Reeder et al. | 359/873 |
| 4,681,408 | 7/1987 | Ahmad et al. | 359/846 |
| 4,688,909 | 8/1987 | Smith | 359/846 |
| 4,832,452 | 5/1989 | Eisler | 359/813 |
| 4,850,674 | 7/1989 | Hasselskog | 359/820 |

Primary Examiner—Loha Ben
Attorney, Agent, or Firm—Stanton E. Collier; Donald J. Singer

[57] ABSTRACT

An optical mirror is kinematically mounted at its sides on one fixed point and two movable points which points are supported by a frame spaced from the mirror. One of the movable points is a ball on a cantilevered arm which rests in a cone or groove in the mirror, the other movable point is a mechanical flexure prelaod mounting or a pneumatic preload mounting, which mountings serve to apply constant preload to such mirror. The mirror is made of ceramic material, of low thermal expansion or contraction and has water cooling passages therein. The frame is made of metal of higher thermal expansion or contraction. However such mirors, when reflecting a high intensity laser beam can thermally expand relative to the frame and must do so with minimal deformation from the desired optical contour thereof which result is accomplished by the resilient and constant preload mountings of the present invention. The preload mounting of the invention also serves to compensate for temperature differentials between the cooled ceramic mirror and its uncooled metal frame.

16 Claims, 5 Drawing Sheets

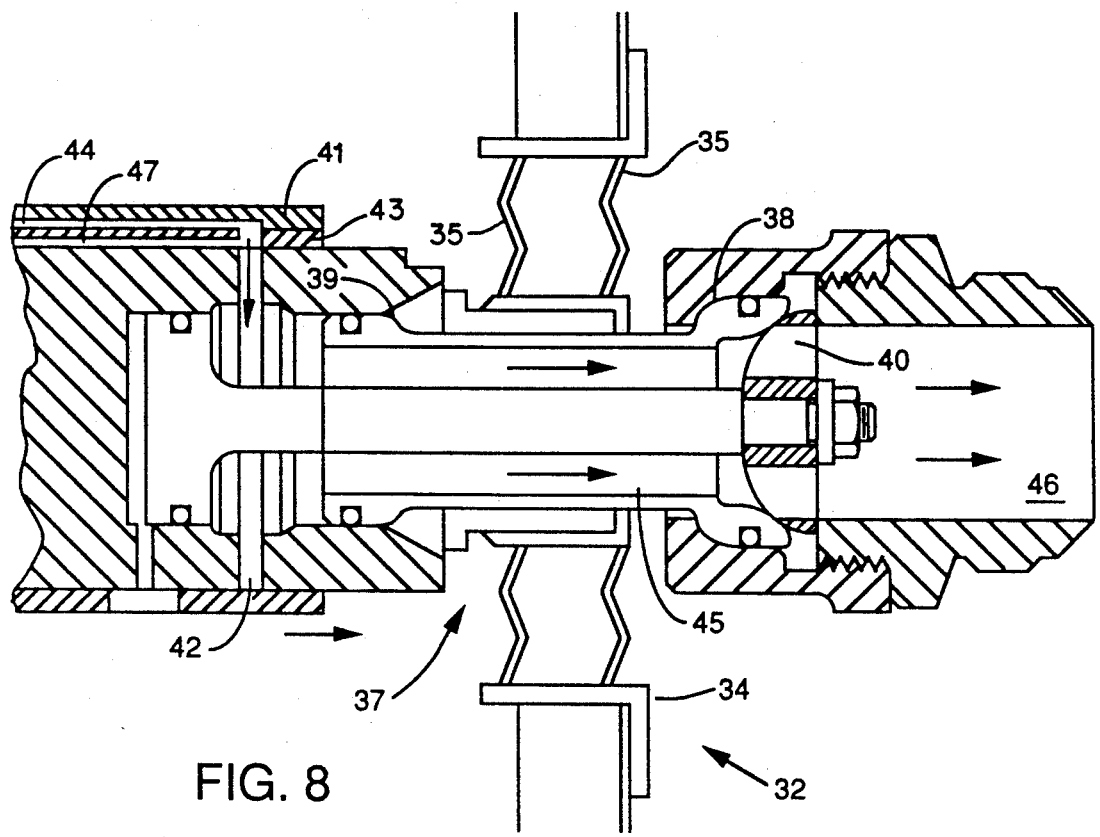
FIG. 8
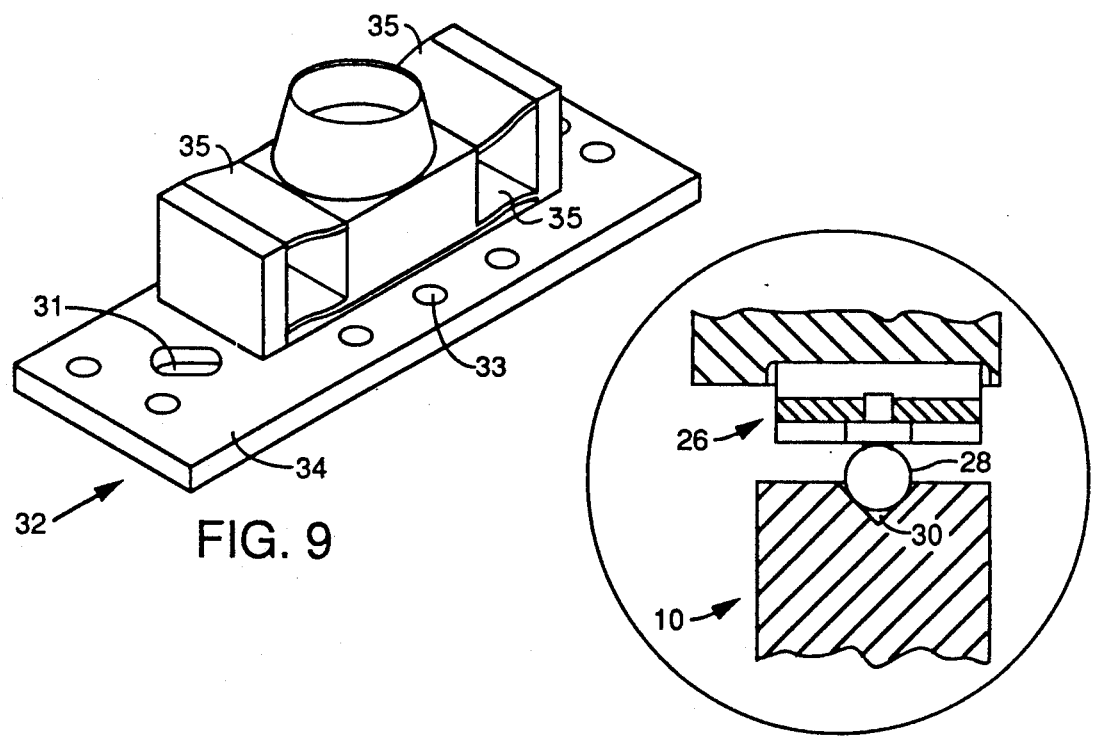
FIG. 9
FIG. 10

KINEMATIC FIXTURING OF OPTIC COMPONENTS

STATEMENT OF GOVERNMENT INTEREST

The invention described herein may be manufactured and used by or for the Government for governmental purposes without the payment of any royalty thereon.

BACKGROUND OF THE INVENTION

1. FIELD OF THE INVENTION

This invention relates to kinematic fixturing in optical systems, particularly mounting optical components under preload so as to minimize deformation during thermal expansion and contraction thereof.

2. THE PRIOR ART

In an optic system, components such as lenses or mirrors can thermally distort, impairing the accuracy of the transmitted and/or reflected beam. Thus if a lens or mirror distort due to heating by a laser beam, 1) the beam can be transmitted at the Wrong size, 2) the beam can be directed off target and 3) the so-transmitted beam undergoes diminished optical quality of wavefront.

In the prior art, considerable attention has been directed toward providing passages in e.g., mirrors, for cooling same with water in a range of 67° to 70° F. so as to avoid or minimize mirror (or lens) distortion due to heating by reflective contact with a laser beam.

Despite such efforts however, portions of the mirror surface are heated by a laser beam above the desired cooling range resulting in expansion and thermal distortion thereof. This is in part due to the mounting of such mirror to a metal backing member, which then mounts to a metal frame (e.g., by metal screws). For examples of such metal backed and mounted mirrors, see Mostel U.S. Pat. No. 3,588,232 (1971) and Eitel U.S. Pat. No. 4,029,400 (1977). These mirrors can be mechanically adjusted in two planes or directions, which adjustments are thereafter fixed, to hold the respective mirrors in place.

Though the metal backing mirror and/or frame be of high quality, e.g., of titanium, despite elaborate mounting systems and the above-noted, water-cooling thereof, mirror distortion upon contact with high temperature laser beams has persisted. Accordingly, for purposes of the present invention, attention has turned to backing such mirrors with ceramic material such as silicon carbide (SiC). Such ceramic has a coefficient of thermal expansion of less than that of molybdenum, has greater stiffness and is more stable against the heat of a laser beam. However ceramics has special mounting problems e.g., to metal frames, in that screw threads induced into such ceramic backing or mounting, are brittle and break or crumble with repeated screw insertions therein. Also some thermal distortion persists even with a ceramic backing and there has been a need to find a mounting for such ceramic backed mirrors that would be more durable and otherwise overcomes the above prior art shortcomings.

There has now been discovered a means for mounting such ceramic backed mirrors that is of a more permanent nature and that permits thermal expansion and contraction of such ceramic optic components so as to lessen or minimize optical distortion thereof and achieve an optical stability not previously seen.

SUMMARY OF THE INVENTION

Broadly the present invention provides a multi-point mount for a framed optic component wherein the component is mounted to a frame, the improvement comprising, a plurality of mountings to the frame at a plurality of sides of such frame, which mountings engage and support the optic component therebetween and spaced from the frame, one of the mountings relatively fixedly engaging the component and at least one other mounting being in resilient preload engagement with the component so that upon temperature change, the optic component can expand or contract under preload relative to the frame, resulting in minimal distortion to such component.

In a preferred embodiment there are three clamp type mountings for a ceramic-backed optical component, such as a mirror, wherein one mounting relatively fixedly engages the component, the second mounting is in cantilevered resilient engagement with the component and the third mounting is a linear bearing in resilient preload engagement with the component so that upon temperature change, the optic component can expand or contract under constant preload relative to the frame (in e.g. three directions, up, down and to the right, per FIGS. 1 and 2), resulting in minimal thermal distortion to the component.

BRIEF DESCRIPTION OF THE DRAWINGS

The invention will become more apparent from the following detailed specification and drawings in which;

FIGS. 4, 6, 7, 8, and 10 are sectional elevation views of components of the preloaded mirror assembly embodiment of the invention, shown in FIGS. 1 and 2;

FIGS. 5 and 9 are perspective views of components of the Preloaded mirror assembly embodiment of the invention, shown in FIGS. 1 and 2

DESCRIPTION OF THE PREFERRED EMBODIMENTS

Figure 1:
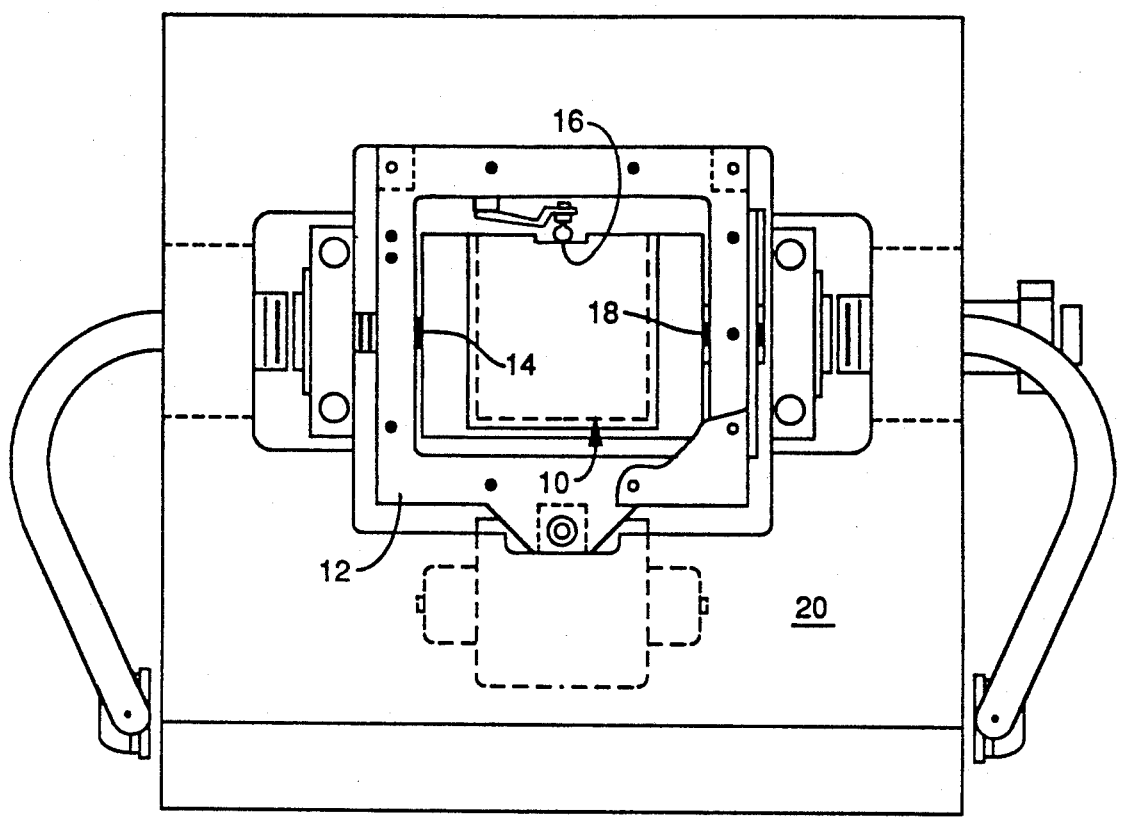
FIG. 1 is a preloaded mirror assembly embodying the present invention.
Figure 2:
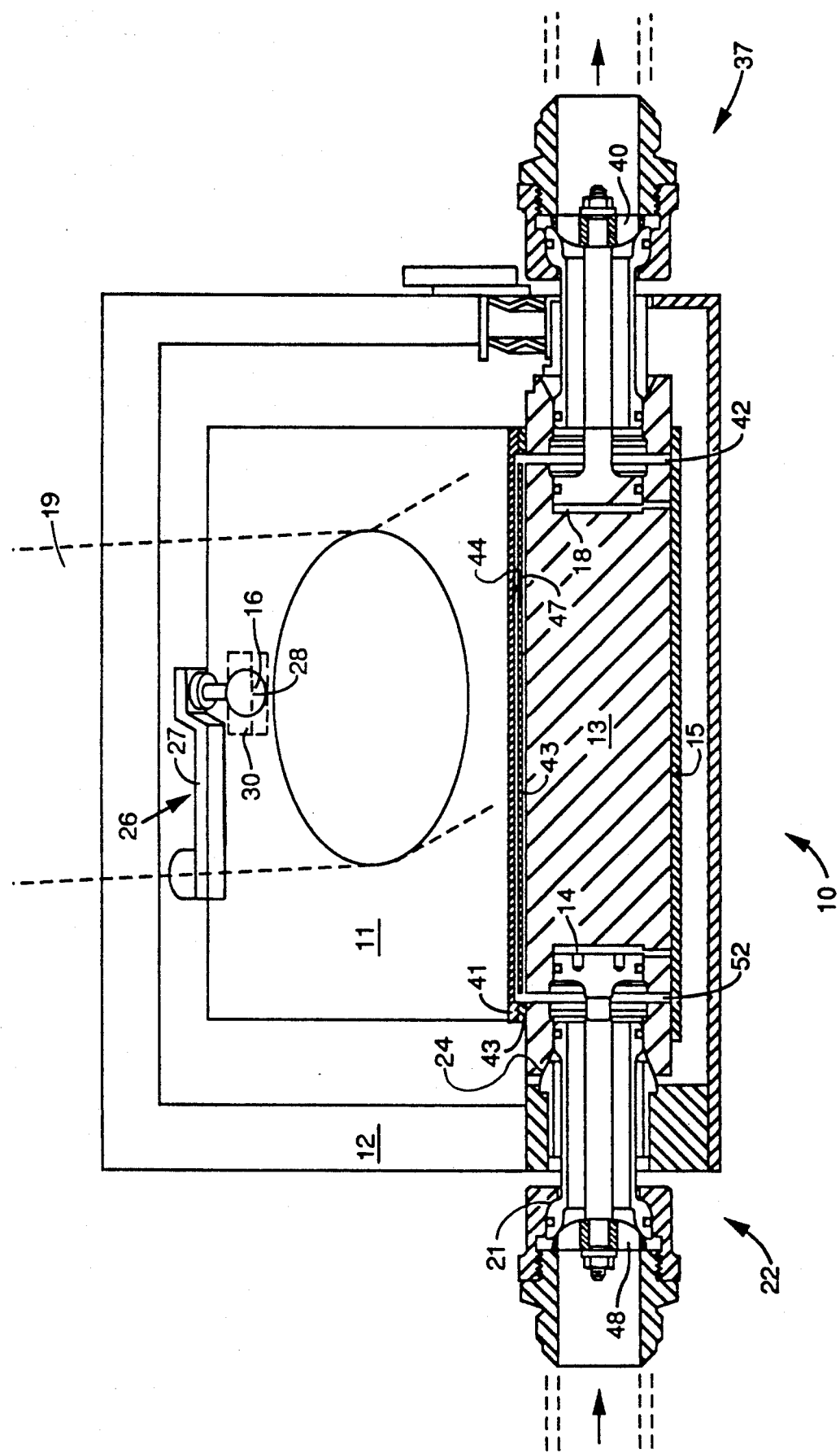
FIG. 2 is a sectional elevation perspective schematic view of the preloaded mirror assembly embodiment of FIG. 1.

Referring now to the invention in more detail, optic component or mirror 10 is mounted to mirror frame 12 at three points, 14, 16 and 18 as shown in FIGS. 1 and 2. The mirror frame 12 attaches in turn, to a frame housing 20 at a plurality of points, as indicated in FIG. 1, which is not the subject of the present invention. Returning to the three mirror mountings, the first mounting at mounting point 14 is fixed, while the second and third mountings at mounting points 16 and 18, are shiftable under preload as discussed below. That is, at mounting point 14, mounting assembly 22 contacts the mirror assembly 10 at fixed support or bearing surface 24, as shown or indicated in FIGS. 2 and 4. Also at mounting point 16, side bearing 26 has cantilevered arm 27, which terminates in a bearing ball 28, which rides in a V-groove 30 in the mirror assembly 10, as shown in FIGS. 2 and 10.

As shown in FIGS. 1, 2, 8 and 9, at mounting point 18, preloaded flexure assembly 32 has metal housing 34 (having various positioning and mounting apertures 31 and 33 therein) and resilient diaphragms 35 to provide a constant preload against the thermal expansion (or contraction) of the mirror assembly 10 without deformation thereof. As indicated in FIG. 8, the diaphragm flexes to compensate for thermal differences between mirror and frame, as does the cantilevered arm 27 (though in another direction), as indicated in FIGS. 1 and 2. The cantilevered arm thus also serves as a preload.

Figure 4:
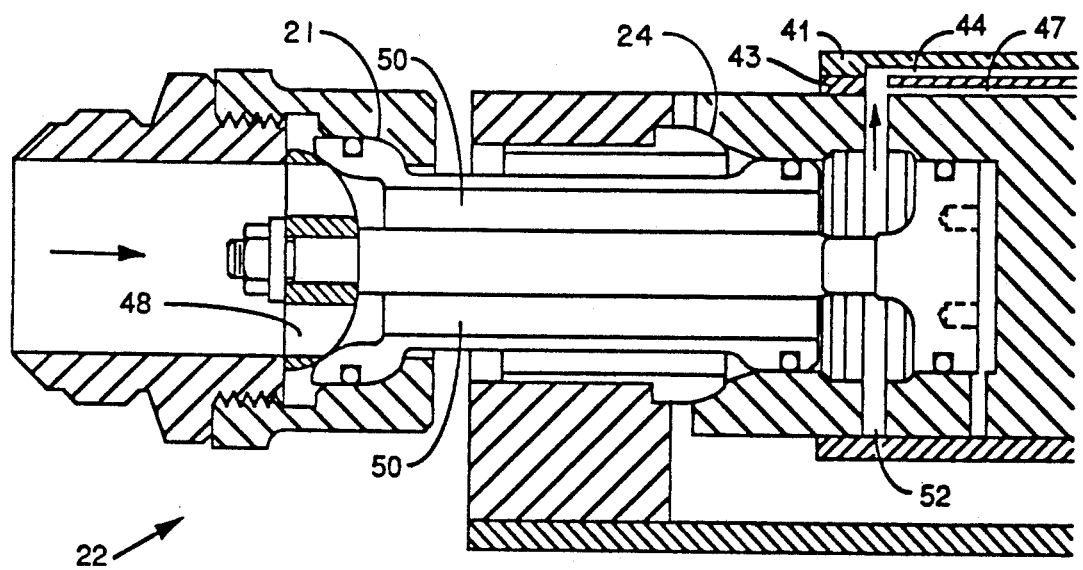
Figure 5:
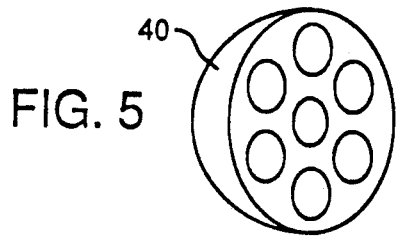

It is noted that the fitting 37 passing through the flexure assembly 32 is in its elements, related or similar to fitting 22 on the opposite side of the mirror 10, as shown or indicated in FIGS. 4 and 8. That is, both include curved bearing surfaces such as surfaces 38 and 39 shown in FIG. 8. Also both include a multi-passaged ball end, e.g. multi-passaged ball end 40, shown in FIG. 5 and located in the fitting 37, as shown in FIG. 8.

Figure 6:
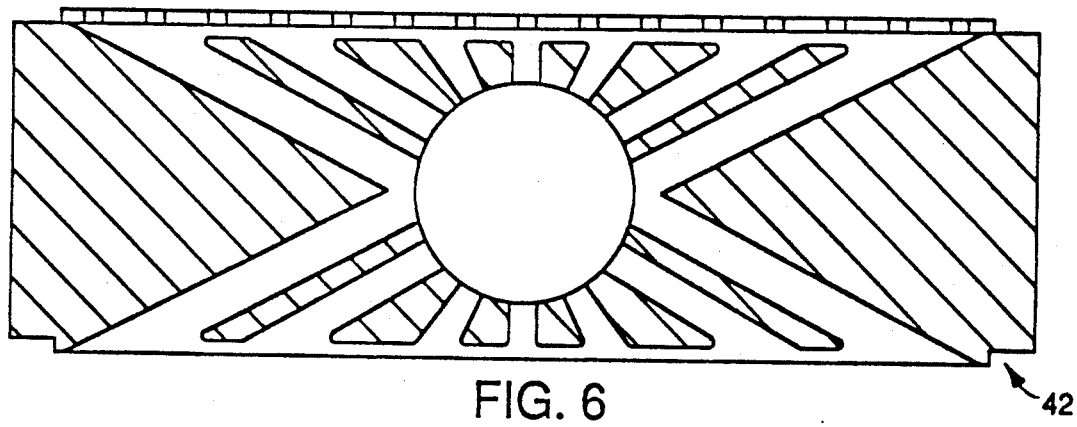
Figure 7:
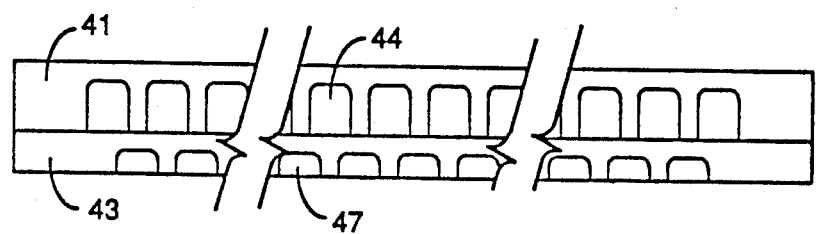

Also each fitting has a balanced moment waterflow manifold, such as manifold 42 shown in FIG. 6 and located proximate water-cooled mirror passages, such as passages 44 and 47 of face plate 41 and back plate 43 shown in FIG. 7 and located in such fitting 37, as shown in FIG. 8.

In operation, cooling water flows through passages 44 and 47 then through the manifold 42 into the fixture outflow passages 45 and through the distributor ball end 40 and then out the exit port 46 of the fitting, as shown in FIG. 8.

On the inlet side of the mirror assembly 10, as shown in FIGS. 2 and 4, inflow water flows through fitting 22 through a distributor ball end 48 and thence through water passages 50, then through a balanced moment manifold 52 and then through mirror cooling passages 44 and 47, over to the outlet side, shown in FIG. 8, where it exits through the fixture 37 through similar components, in reverse sequence, as discussed above.

Thus the mirror face of the mirror assembly of the invention is cooled against the heat of, e.g. a laser beam to reduce heating thereof and to the extent such mirror assembly is heated, it can expand with 2° of freedom from its fixed point mounting 22 by way of its moveable mounting 26 and against its preloaded flexure mounting 32, as discussed above and indicated in FIGS. 2, 4, 10 and 8.

Figure 11:
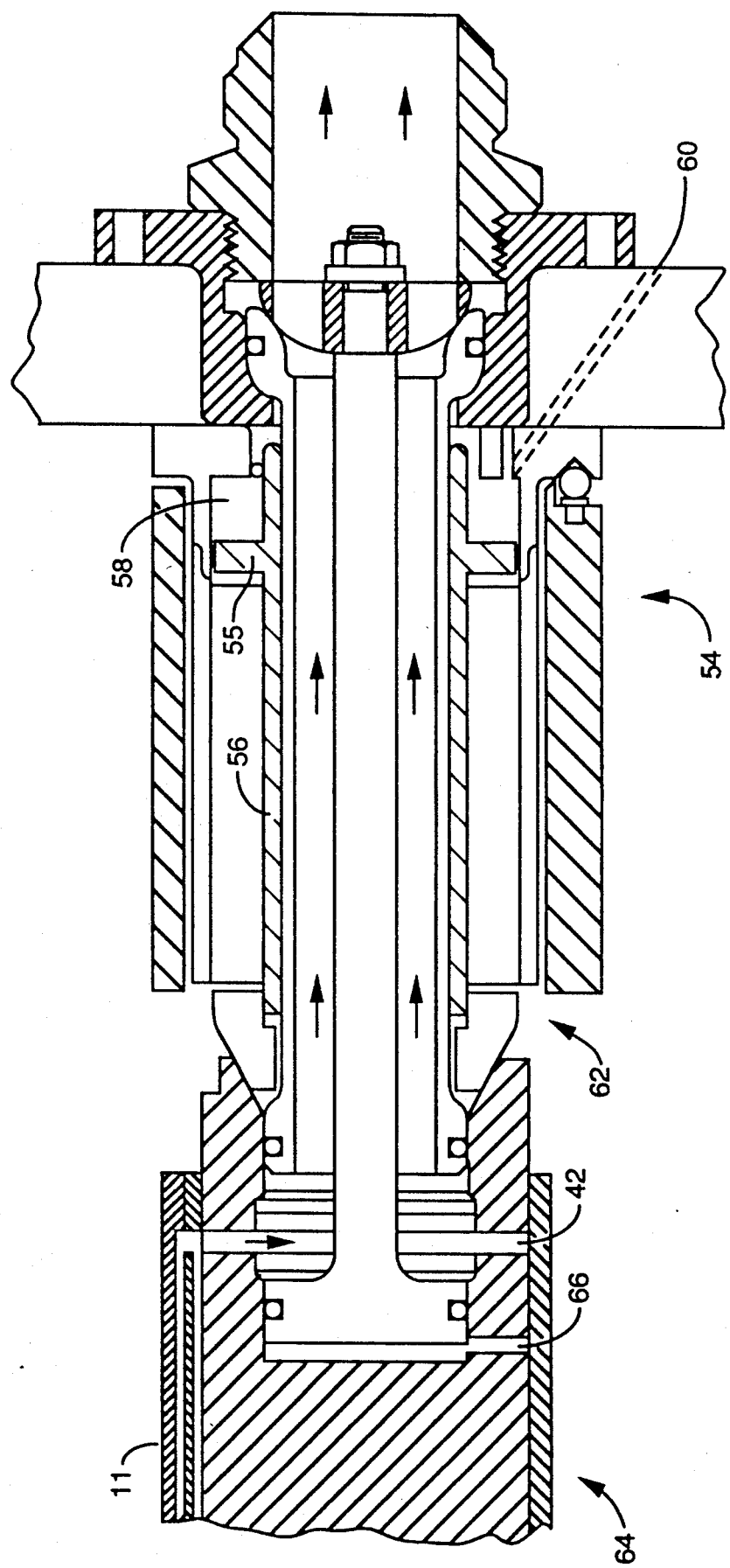
FIG. 11 is a sectional elevation view of an alternative component of the preloaded mirror assembly embodiment of the invention shown in FIGS. 1 and 2.

In another embodiment of the invention, the flexure preloaded assembly 32, shown in FIG. 8, is replaced with a pneumatic or hydraulic preload assembly 54 as shown in FIG. 11. Accordingly an annular piston 55 mounted on hollow sleeve 56, reciprocates in annular chamber 58, which is fed compressed gas e.g., air or hydraulic fluid, through passage 60 (by means not shown) as shown in FIG. 11. A water-cooled fitting 62 similar in construction and components to fitting 37, shown in FIG. 8, is mounted within the sleeve 56, and contacts a water-cooled mirror assembly 64, in the manner previously described with respect to FIG. 8.

In operation, pneumatic pressure of e.g., compressed air is fed through passage 60 into the annular chamber 58 to establish a desired pneumatic preload against the annular cylinder 55 and thus against the movable fitting 54 and in turn against the mirror assembly 64, as shown in FIG. 11. Accordingly the mirror assembly 64, upon thermal expansion thereof pushes the fitting 54 and the annular cylinder 55 against the pneumatic preload in the chamber 58, which pneumatic pressure can be adjusted (by a gas inlet not shown) to achieve the desired back pressure or preload for undeformed thermal expansion (or contraction) of the mirror assembly 64, as indicated in FIG. 11.

Since the pneumatic preload shown in FIG. 11, is readily adjustable to counteract various thermal expansions of a mirror assembly, it is preferred over the flexure assembly embodiment 32 shown in FIG. 8. The hydraulic preload system is similarly preferred over the flexure assembly embodiment.

Note that all water fitting assemblies have an outlet for trapped air at the end thereof in the mirror assembly, such as outlet 66 in mirror assembly 64, as shown in FIG. 11.

Figure 3:
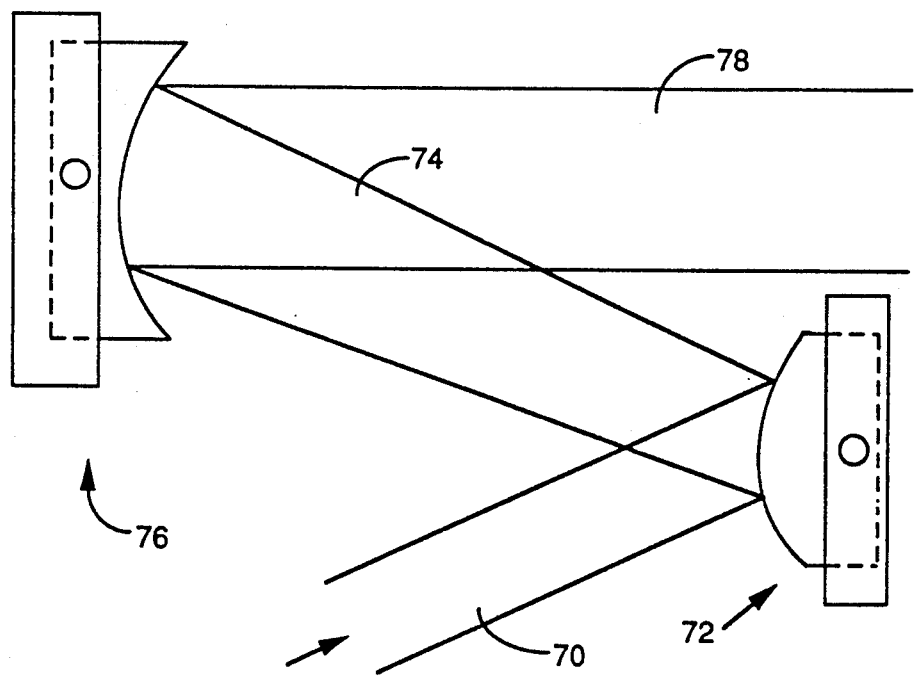
FIG. 3 is a schematic, elevation view of preloaded mirror assembly embodiments according to the present invention.

An example of the constant preload, non deformable mirrors of the invention is shown in FIG. 3, wherein high temperature parallel laser beam 70 contacts the surface of convex mirror 72 of the invention and reflects therefrom as a divergent beam 74 which contacts the surface of a concave mirror assembly 76, of the invention, and reflects therefrom as enlarged collimated laser beam 78.

It is important that the above mirrors thermally expand without deformation, as discussed above, since a deformation of one or both mirrors will distort and/or misdirect the beam from its intended size and direction.

The body of the mirror assembly of the invention is desirably made of thermally stable ceramic such as silicon carbide, SiC. The mirrored surface thereof is desirably made from silicon applied thereto e.g., by vapor deposition on the ceramic surface, which silicon is then polished to a reflective coating of e.g., 1 to 10 $\mu$m to form e.g. mirror surface 11 per FIG. 11. The water passages are also of silicon carbide.

As noted above, the major part of the mirror assembly is preferably of SiC. That is, the mirror assembly has 2 face plates with cooling passages therein 44 and 47, as shown in FIGS. 7 and 2, which plates mount on substrate 13, backed by closure plate 15, as shown in FIG. 2. All of these mirror assembly components are made of SiC, with the balanced moment manifold, shown in FIG. 6, being etched or machined into the substrate 13, which manifolds 42 and 52 are enclosed between the water-cooled plates 41 and 43 and the closure plate 15, as shown in FIG. 2. Except for the diaphragms 35, the remainder of the fittings 22, 37, the arm 27 and the frame 12, are of metal e.g., aluminum and preferably of stainless steel, including the multi-apertured ball ends 40 and 48, shown in FIGS. 5 and 2. As noted above, the upper surface of the top water-cooled plate 41 is of SiC and preferably has silicon vapor deposited thereon which is polished to a high degree of reflectance.

The arm 27 and ball 28 of the cantilevered fitting 26 can be e.g. of metal, plastic or ceramic. The arm 27 is preferably of metal such as stainless steel and the ball 28 is preferably of plastic such as polyethylene or "teflon", polytetrafluoroethylene (PTFE).

The ball 28 of the cantilevered fitting 26, preferably glides in a groove 30 during mirror expansion and contraction, as indicated in FIG. 2. However, for small mirrors, e.g. under ½ meter in diameter or for larger tolerances, such ball can seat in a conical, curved angled or other recess in the mirror substrate, as desired, within the scope of the invention.

As indicated above, the preload flexure fitting of FIGS. 2 and 9 can be of metal, e.g. stainless steel with resilient diaphragms attached thereto e.g. of stainless steel foil, 10 to 20 mils thick.

The pneumatic sleeve and annular cylinder of FIG. 11, is likewise of metal such as stainless steel.

The mirror surfaces of the invention can take various shapes as desired, such as flat, cylindrical, spherical, toric, aspheric, concave, convex or a combination thereof as desired, per the invention.

As noted above with respect to FIG. 3, a high intensity laser beam heats the mirror assembly thereof, which is counteracted in part by the double-pass, flow-cooling of the mirror surfaces by, e.g. water plus allowing the mirror assembly to expand with 2° of freedom against a flexure preload, or a pneumatic preload, as discussed above.

Thus the mirror assembly of the invention provides a flow-cooled optic for high power applications, i.e. SiC mirrors for high energy laser systems (HEL).

Further the invention provides accurate repeatable mounting of large cooled mirrors. The technique includes using pneumatic (or hydraulic) pressure preload or a mechanical flexure preload to provide the axial trunion mount-loading employed water-cooled high energy laser optics. In large cooled optics it is essential that an accurate repeat of the mounting forces be obtained during polishing and metrology cycles where the mirror is repeatably removed from its mount to be polished and reinstalled to measure the result of the polishing run. The pnuematic pressure supply can be regulated to automatically compensate for thermal growth differential between the cooled mirror material and uncooled frame material that occurs due to environmental and operational temperature changes.

The balanced moment manifold serves to eliminate tilt induced by unequal pressures in the inlet and outlet manifolds, were no pressurized water fed to the dead-ended manifold, passages at the rear side of the mirror assembly. As indicated above, the mirror assembly 10 (per FIG. 2) is attached to the mirror frame by way of 3 point center of gravity kinematic fixturing with 2° of freedom, as discussed below. A flexure preload mount or a pneumatic preload mount serves to compensate for thermal growth differential between mirror and frame as noted above. The opposite side of the mirror is supported by a fixed-end attachment point which is shimmed to preload the flexure preload support opposite thereto.

Thus the invention provides for constant force kinematic fixturing of optical mirrors including telescope mirrors employing a 3 point mounting wherein 1 point is fixed and the other 2 are movable under constant preload to avoid distortion of a thermally expanding or contracting mirror. With a pneumatic piston preload, the air pressure can be regulated to compensate for thermal growth differential between a cooled mirror mounted on an uncooled frame as noted above. The pneumatic preload or the flexure preload of the present invention provides for repeatable mounting of a mirror after a number of polishing steps.

The kinematic fixturing, constant preload mirror mounting of the present invention addresses 3 technical problems in mirror mounting; 1) compensates for thermal growth differential between cooled mirror and uncooled mount or frame and/or between mirror and mount of dissimilar materials (which have different coefficients of thermal expansion), 2) compensates or corrects mirror jitter and 3) corrects for non constant loads at the mounting points The pneumatic piston preload embodiment of the invention applies a load to the mirror assembly that is constant and directly measurable using static pressure sensing devices.

Thus the mirror assemblies embodying the present invention are provided with a constant preload or compressive force whether such mirror expand or contract, preventing (or minimizing) a change in the mirror contour or deformation thereof.

For example, when the optic is moved from a room at 60° F. to a room at 70° F., a thermal differential can occur between the ceramic optic and the steel frame. That is, the frame expands more than the optic which requires inward movement of the preload mounting and cantilevered arm, relative to the frame to prevent deformation of the optic surface.

Then when a laser beam is directed to the optic surface, it heats and expands relative to the frame and the preload mounting and cantilevered arm now move outwardly relative to such frame to preserve the desired mirror contour.

In operation e.g., when a high intensity laser beam is reflected off the surface 11 of mirror assembly 10, the water cooled plates heat and thermally expand more than the substrate 13, which would cause a bow or deformation in such bonded mirror assembly but for the kinematic flexure assembly 37 which shifts outwardly under constant preload to compensate for the thermal expansion thereof as discussed above. Of course the flexure support 37 can shift inwardly once the mirror assembly contracts (relative to the frame) at reduced temperatures.

As noted above the flexure assembly is preloaded by inserting a shim in the opposite or fixed support e.g., fitting 22 shown in FIG. 2. The pneumatic preload fitting, on the other hand, does not require such shimming since it is preloaded by charging pressurized gas e.g., air into the annular pressurized chamber 58 shown in FIG. 11, as noted above. However, gas must be released from the chamber as the mirror assembly expands outwardly, to maintain a constant backpressure or preload in such chamber and for that purpose, a pressure regulator (not shown) is attached to the gas passage 60 to input, e.g. air to or bleed air from, such annular chamber 58, to maintain such constant preload against or in cooperation with, the mirror assembly 64.

The flexure preload fitting is suitable for optical mirrors ½ meter or less in diameter or width, while the pneumatic preload fitting is also useful for such sizes and for mirrors greater than ½ meter in diameter or width.

What is claimed is:

1. In a multipoint mount for an optic component wherein said component is mounted to a frame, the improvement comprising three mountings to said frame on a plurality of sides of said frame which mountings engage and support said optic component therebetween and spaced from said frame, the first mounting relatively fixedly engaging said component, the second mounting being in resilient engagement with said component and the third mounting being in resilient preload engagement with said component so that upon temperature change, said optic component can expand or contract under preload relative to said frame, resulting in minimal thermal distortion to said component.

2. The multipoint mount of claim 1 wherein said first mounting includes a swivel joint therein.

3. The multipoint mount of claim 1 wherein said second mounting is an arm which resiliently engages said component.

4. The multipoint mount of claim 3 wherein said arm carries a ball which engages a recess in said component.

5. The multipoint mount of claim 3 wherein said arm carries a ball which engages a groove in said component.

6. The multipoint mount of claim 1 wherein said third mounting is a resilient linear bearing under constant preload.

7. The multipoint mount of claim 6 wherein said linear bearing is a diaphragm type flexure bearing.

8. The multipoint mount of claim 1 wherein said third mounting is a linear bearing having a pneumatic piston therein in contact with said component, which piston reciprocates in a gas chamber and means for bleeding or feeding gas to said chamber to maintain a constant preload against said piston and against said component as it expands and contracts.

9. The multipoint mount of claim 1 wherein said optic component is of ceramic material having a reflective surface, which ceramic component is clamped between said three mountings.

10. The multipoint mount of claim 9 wherein passages are provided within said first mounting, which communicate with channels in said ceramic component to permit fluid cooling thereof.

11. The multipoint mount of claim 10 wherein means feed cooling water through the passages of said first mounting and through the channels of said ceramic component and out through passages of said third mounting, to maintain same in a desired temperature range.

12. The multipoint mount of claim 11 wherein said component is a concave mirror or a convex mirror.

13. The multipoint mount of claim 10 having a balanced moment manifold or third set of passages running across the thickness of said component between and communicating with said passages and channels to minimize pressure induced distortion at the component surface.

14. The multipoint mount of claim 1 wherein said component is a concave mirror or a convex mirror.

15. The multipoint mount of claim 1 wherein said component is positioned in an optic assembly to reflect, resize and/or redirect a laser beam, while maintaining substantially constant preload and minimal distortion and thus reflective accuracy, despite the heat of the so-applied laser beam.

16. The multipoint mount of claim 1 wherein said third mounting is a linear bearing having a hydraulic piston therein in contact with said component, which piston reciprocates in a chamber and means for bleeding or feeding hydraulic fluid to said chamber to maintain a constant preload against said piston and against said component as it expands and contracts.

* * * * *